3,399,838
REDUCTION OF CEREAL GRAINS TO FLOUR
William F. Hanser, Cedar Rapids, Iowa, assignor to National Oats Company, Cedar Rapids, Iowa, a corporation of Illinois
No Drawing. Continuation-in-part of application Ser. No. 521,828, Jan. 20, 1966. This application May 13, 1966, Ser. No. 549,818
4 Claims. (Cl. 241—8)

ABSTRACT OF THE DISCLOSURE

Whole kernels of grain covered with bran fibers are reduced to flour with a minimum of ruptured cells by chilling the kernels to an embrittlement state at a temperature in the range of about −50 to −225 F., and grinding the embrittled kernels and fibers thereon to flour fineness.

---

This application is a continuation-in-part of my copending application Ser. No. 521,828 filed Jan. 20, 1966.

This invention relates to the reduction of cereal grains to flour, such as to coarse or fine flour granulations, etc. The invention is particularly useful in the reduction of whole kernels, including their bran layers, under cryogenic conditions to prepare flour products containing the kernel cells largely intact and with the bran cells thereof in such fine condition as not to affect the uniformly good appearance of the flour. The invention is also particularly useful in preparing products for further processing in which damage to the kernel cells is undesirable.

The layer of bran on the kernel, such as, for example, oats, wheat, etc., has long presented a problem in the processing of such cereal grains because the fibers in such layer are difficult to grind and to reduce, and unless special processing steps are employed to remove them, such fibers appear in the product as brown specks and give it an unsatisfactory appearance. Extraction and separation operations are therefore employed to bring about a removal of the bran filters, but with such removal important nutritive values are lost. Micro-pulverizing procedures have been employed in which the ground kernels are recycled for repeated grinding operations, but such processing is extremely expensive and is not practicable because of excessive rupturing of the kernel cells.

In the reduction of the kernels of cereal grains, such as, for example, oats, wheat, corn, popcorn, rice, etc., a number of additional problems have long existed. In grinding the kernels to a fine condition, there is a high horsepower cost. Further, the mechanical heat produced from the attrition in grinding raises the temperature of the product into the maximum reproduction range of bacteria. For example, flat sour spores and thermophilic bacteria thrive at temperatures of 130° F., and this temperature is attained in the grinding of groats to form oat flour. Further, in the grinding operation, fire and explosions can occur when the oxygen ratio is sufficiently high, and this presents a hazard.

The problem is further complicated by rancidity dangers arising from the cracking of fat molecules which are split into free fatty acids which in turn develop rancidity in the product. The cell damage produced in grinding further has an adverse effect on the protein, amino acids and vitamins. If the cells can be preserved intact and the protein, amino acids, vitamins, etc., preserved in their natural state, it is found that they can be utilized by animals and humans more completely. Assimilation of the proteins, amino acids and vitamins is greatly improved when the cells are not damaged in the manufacturing process.

A still further probem arises out of the losses in the various processing steps, so that the yield of product is not as high as that desired. The rupturing of cells which occurs during grinding and other processing steps further provides a problem when the products are to be employed for further processing. For example, where the ground material, such as flour, is to be formed into breakfast cereals, etc., more water has to be added to the ground material where the cells have been substantially ruptured than where the cells are more clearly intact. The added water necessarily has to be removed in later processing, and since some of this water becomes water of constitution, substantial heating is made necessary.

I have discovered that by chilling the whole kernels of cereal grains under cryogenic conditions to a critical embrittlement temperature and thereafter grinding under cryogenic conditions at ordinary horsepower cost, the bran layers and the fiber cells thereof shatter into fine fragments so that the resulting flour product containing the fragmented fibers has a uniformly good appearance and is useful for the forming of breakfast cereals and other food products. I have further discovered that under such conditions, the product is obtained with a minimum of ruptured cells, as, for example, less than 0.5 to 1.0 percent. Further, the grinding is accomplished in a time period less than half of that required at ambient temperatures, and a substantially higher yield is obtained. By using cryogenic materials for grinding, the high temperatures providing the maximum reproduction of bacteria are avoided and the bacteria do not increase but remain dormant at low temperatures. Further, the use of the cryogenic materials dilutes the oxygen, reducing the oxygen ratio and thus reducing the hazard of fire and explosion. The cryogenic materials further provide a rancidity and free acid control, and the protein, amino acids and vitamins are kept within their natural state where they can be best assimilated or utilized by animals and humans.

A primary object, therefore, is to provide a process for reducing whole kernels of cereal grains to a fine condition with a minimum of damage to the cell structure and with the bran of the grains present in such fine condition that they are hardly visible to the eye. A further object is to provide such a process while using less horsepower in grinding and providing a higher yield of product of the desired fineness and including the bran of the original kernels. A still further object is to provide a process in which the cereal kernel is chilled to a critical embrittlement stage or condition, permitting rapid grinding while preserving the mass of the kernel cells intact and while shattering the bran fibers into fine condition. Other specific objects and advantages will appear as the specification proceeds.

In one embodiment of my invention, the kernel of the cereal grain is chilled by the use of liquid nitrogen, $CO_2$, and other well-known means for obtaining cryogenic conditions to a temperature at which the kernel is embrittled and at which it may be readily ground in a minimum of time to a fine condition. Such embrittlement can be brought about almost instantaneously by reducing the temperature to −50 to −225° F. I prefer to employ a temperature range of about −80 to −110° F. The kernels while still embrittled are passed into a grinder equipped with an appropriate chamber for handling subzero temperatures, and the grinding is accomplished while the kernels are in the embrittled condition. For example, the embrittled kernels may be passed to an insulated grinding chamber of a hammer mill and the grinding accomplished in the mill.

The grinding time is reduced greatly over the time required for grinding the kernels for the desired fineness at ambient temperatures, such time being less than half the time required for grinding the kernels under ambient temperatures. Since the grinding time varies with the type of grinding devices employed, it is sufficient to state here that the grinding is carried on for a period sufficient to produce a product having less than one percent of its cells ruptured. This time interval can be readily determined by examining the product produced by a specific grinder and the interval required for producing the product. For example, employing a hammer mill and a one horsepower motor and in producing an oat flour product of which 90 percent passes a U.S. standard #35 screen, a grinding period of 2½ hours would be required.

In the preparation of an oat flour product, I prefer to first steam the groats for about 5 minutes at a temperature of about 230° F. to inactivate the lipase enzyme and other enzymes, and thereafter the groats are cooled and chilled to a temperature of about −80 to −110° F. to embrittle the groats. The embrittled groats are then ground in a hammer mill to a 100 percent oat flour.

In the treatment of wheat berries or kernels, the same procedure may be followed. If desired, the steam step may be omitted, and the wheat berry may be then chilled to a temperature of −50 to −125° F. (preferably −80 to −110° F.), and the product then ground to a wheat flour. If desired, the wheat berry may be abraded in suitable apparatus, as, for example, a barley pearler to remove the bran layer and, if desired, the wheat germ, and the wheat berry then processed by chilling to the above-mentioned critical ranges and ground to a wheat flour. I prefer, however, to employ the first-mentioned procedure in which the whole berry is ground because the use of the abrading apparatus after removing the bran layer results in a loss of nutritive material.

The process may be employed with or without the foregoing modifications in the treatment of popcorn, rice, field corn, barley, rye, and similar cereal grains.

The following examples may be set out as illustrative of embodiments of the invention:

EXAMPLE I

One hundred pounds of oat groats were steamed at a temperature of 230° F. for 5 minutes to stabilize the enzyme. The groats were then cooled to about 80° F. and then chilled with liquid nitrogen to a temperature of −110° F. The groats were then ground in a Fitz hammer mill having an insulated grinding chamber at the rate of $3.45 \times 10^{-3}$ horsepower per pound per hour. The consumption of liquid nitrogen was 0.72 pound of liquid nitrogen per pound of groats. The screen size was 0.040″. The screen analysis of the product was 99.5 percent through a U.S. standard #35 sieve, 87.5 percent through a U.S. standard #50 sieve, and 62.3 percent through a U.S. standard #70 sieve. An analysis of the flour found that it had only 0.5 percent cell damage. In other words, 99.5 percent of the cells were intact. The bran fragments in the flour were so fine that on visual inspection they were hardly visible unless the flour were spread into a very fine layer and carefully examined. The entire flour product had a uniformly good appearance. It was accepted and used by a manufacturer in the production of commercial oat flake breakfast food.

EXAMPLE II

The process was carried on as described in Example I except that the screen size was 0.020″ and the power requirement was $4.93 \times 10^{-3}$ horsepower per pound per hour, with a liquid nitrogen consumption of 1.18 pounds per pound of oat groats. The screen analysis was 100 percent through a U.S. standard #35 sieve, 94.0 percent through a U.S. standard #50 sieve, and blinds U.S. standard #70.

The yields obtained in Examples I and II were 5 to 8 percent more than the yields obtained in normal operations where the processing was at ambient temperatures, while at the same time the quality of the flour was comparable.

EXAMPLE III

In applying the process to wheat, the hulled wheat is first washed to remove impurities and then the entire kernel is chilled with liquid nitrogen into the temperature range of about −50 to −125° F. The wheat kernels at this temperature are then ground, as described in Example I, to produce a flour having the bran fibers thereof shattered into fragments barely visible in the final flour product. In such processing, less than 0.5 percent of the cells are ruptured. The bran fibers are shattered in the grinding operation to a very fine condition, and the resulting fragments distributed through the flour body are not noticeable on general inspection of the flour.

EXAMPLE IV

In applying the process to wheat and in addition to washing the wheat to remove impurities, the wheat may be scoured with a scourer or pearler to remove the bran and the scoured and pearled wheat kernels ground along with the cryogenic material ($CO_2$) to the desired granulations and the ground product cooled to room temperature. The product may be purified, if necessary, and air classified to the desired protein or granulation levels. I prefer to employ the process described in Example III because by the procedure employed therein all of the nutritive values of the original whole kernel are retained.

By the foregoing procedures, the problems heretofore associated with the bran layers of oats and wheat kernels, etc. have been overcome, and the volume of the recovered product increased by the retention of the bran material within the final product and in such fine condition that the flour product has a uniform and attractive appearance. While the bran fibers in the ground flours heretofore produced have prevented the product from passing through fine mesh screens, such as 100 mesh U.S. standard screens, it is now found that such fibers under cryogenic conditions and under grinding at normal or less than normal horsepower costs shatter to such a fine condition that they do not affect the appearance of the final product and the final product will nearly all pass through a 100 mesh screen U.S. standard.

It was surprising to discover that the bran fibers, which are hard to reduce and to grind under normal grinding conditions at ordinary temperatures, attained a critical brittleness under temperatures in the range of −50 to −225° F. and responded to normal grinding by shattering into minute particles which become uniformly distributed throughout the flour during the grinding operation. Further, it is found that under such temperature range not only are the kernels shattered during the grinding operation to produce flour with less than one percent of the cells ruptured, but also there is substantially no internal cell breakdown. The bran layer and the germ, which constitute the hardest parts of the kernel, respond to the critical embrittlement temperatures even more effectively than the remaining cellular material, and it is possible that this brings about the shattering characteristics above described. This is a possible explanation at least of the extreme shattering of the bran fibers the greater proportion or bulk of which may be brought into submicron size in the grinding operation under cryogenic conditions.

While in the foregoing specification I have set out procedure in considerable detail for the purpose of illustrating embodiments of my invention, it will be understood that such details may be varied widely by those skilled in the art without departing from the spirit of my invention.

I claim:

1. In a process for reducing to flour whole kernels of cereal grain covered with bran fibers, the steps of chilling such whole kernels to an embrittlement state at a temperature in the range of about −50 to −225° F., and grinding the whole kernels in said embrittlement state to flour fineness while shattering the bulk of the bran fibers to submicron size.

2. The process of claim 1 in which the kernels are chilled to about −80 to −110° F.

3. In a process for reducing to flour with a minimum of ruptured cells, whole kernels of grain covered with bran fibers, the steps of chilling such kernels to an embrittlement state at a temperature in the range of about −50 to −225° F. and grinding under said temperature conditions the embrittled kernels to flour fineness while shattering the bulk of the bran fibers to submicron size.

4. The process of claim 3 in which the kernels are oat kernels.

References Cited

UNITED STATES PATENTS

| | | | |
|---|---|---|---|
| 1,751,032 | 3/1930 | Dienst | 241—8 X |
| 2,227,634 | 1/1941 | Dalin | 241—8 |
| 2,509,418 | 5/1950 | Brown | 241—8 |
| 2,583,697 | 1/1952 | Hendry et al. | 241—8 X |
| 2,919,862 | 1/1960 | Beike et al. | 241—65 X |
| 3,255,220 | 6/1966 | Baer et al. | 241—8 X |

OTHER REFERENCES

"New Nitrogen Technic Assures Fine Grinding—In Only One Pass," by Gerard Miller, Food Engineering, July 1951, pp. 36 and 37.

WILLIAM W. DYER, JR., *Primary Examiner.*

F. T. YOST, *Assistant Examiner.*